United States Patent
Adams et al.

(10) Patent No.: US 6,524,849 B1
(45) Date of Patent: Feb. 25, 2003

(54) BIOLOGICAL FILTER STRUCTURES

(75) Inventors: Baron V. Adams, Oregon City, OR (US); Paul C. John, Beaverton, OR (US); Charles S. Swift, Milwaukie, OR (US)

(73) Assignee: Bio-Reaction Industries, LLC, Tualatin, OR (US)

( * ) Notice: Subject to any disclaimer, the term of this patent is extended or adjusted under 35 U.S.C. 154(b) by 0 days.

(21) Appl. No.: 09/938,466

(22) Filed: Aug. 23, 2001

(51) Int. Cl.[7] .......................... C12M 1/14; B01D 33/70; B01D 47/16
(52) U.S. Cl. ............................ 435/299.1; 435/293.1; 435/297.1; 210/150; 210/615; 210/616; 261/72; 261/94
(58) Field of Search ................................. 210/150, 615, 210/616; 261/72, 94; 435/289.1, 293.1, 297.1, 299.1

(56) References Cited

U.S. PATENT DOCUMENTS

| | | | | |
|---|---|---|---|---|
| 4,122,011 A | * | 10/1978 | Strigle, Jr. .................. | 210/150 |
| 4,333,893 A | * | 6/1982 | Clyde ........................ | 210/150 |
| 4,581,299 A | * | 4/1986 | Jager ..................... | 261/DIG. 72 |
| 4,600,544 A | * | 7/1986 | Mix ........................... | 202/158 |
| 4,668,442 A | * | 5/1987 | Lang .......................... | 261/94 |
| 4,842,920 A | * | 6/1989 | Banai et al. ................. | 210/150 |
| 5,217,616 A | * | 6/1993 | Sanyal et al. ................ | 210/150 |
| 5,690,819 A | * | 11/1997 | Chianh ........................ | 210/150 |
| 6,326,191 B2 | * | 12/2001 | VanToever ................... | 210/167 |
| 6,423,537 B1 | * | 7/2002 | Soria et al. ............ | 210/321.78 |

* cited by examiner

Primary Examiner—David A. Redding
(74) Attorney, Agent, or Firm—John Smith-Hill; Smith-Hill and Bedell

(57) ABSTRACT

A biological filter element includes a support element of generally ellipsoidal configuration. The support element has two opposite polar regions and includes a medial ring intermediate the two opposite polar regions and a plurality of arcuate ribs extending from the medial ring to each polar region. Adjacent arcuate ribs are angularly spaced to provide access to an interior space of the support element. A cohesive body of biologically active material surrounds the support element and penetrates the interior space of the support element.

13 Claims, 2 Drawing Sheets

BIOLOGICAL FILTER STRUCTURES

BACKGROUND OF THE INVENTION

This invention relates to biological filter structures.

Volatile organic compounds (VOCs) of various kinds are widely used in many industrial processes. Typical VOCs include acetone, benzene, toluene, xylene and methyl ethyl ketone (MEK). Disposal of VOCs or substances containing VOCs represents a significant problem for many industries.

A known technique for disposal and/or destruction of VOCs from certain sources is to allow any volatilizable compounds to evaporate at ambient temperature into an effectively unconfined space. Since the VOCs evaporate at an uncontrolled rate, and the space into which the VOCs evaporate is effectively unconfined, the concentration of VOCs in the atmosphere in the vicinity of the residue material does not normally become bothersome, but this practice nevertheless contributes to atmospheric pollution.

U.S. Pat. No. 5,518,920 discloses apparatus for capturing air that contains VOCs in the vapor phase and for processing the air in order to convert the VOCs to a nontoxic form. In particular, U.S. Pat. No. 5,518,920 discloses a biological filter unit comprising a housing containing biologically active filter material. The filter material includes plant compost, which is typically a mixture of various types of plant debris, such as leaves, grass and wood, and contains microorganisms (fungi and bacteria) that have an affinity for VOCs and consume VOCs as nutrients. The compost may also contain micronutrients such as nitrogen and potassium. The housing has an inlet opening at the bottom for supply of feed air and an exhaust opening at the top. Feed air containing VOCs is supplied to the inlet opening and flows upwards through the filter material. The microorganisms capture and consume the VOCs, and accordingly, under appropriate operating conditions, the concentration of VOCs in the exhaust air is substantially less than the concentration of VOCs in the feed air.

In order to provide the filter unit with sufficient resilience to withstand heavy loadings of VOCs, it is necessary that the filter unit should contain a large population of microorganisms, which in turn requires a large quantity of compost. In the filter unit disclosed in U.S. Pat. No. 5,518,920, the compost is supported in generally horizontal beds. Cost considerations dictate that the number of beds be kept to a minimum, and consequently in order to provide the required quantity of compost, the beds are fairly thick. Specifically, the beds may have a depth of up to about 36 inches.

It is believed that a major part of the biological activity of a biofilter takes place at the surface of the mass of filter material, where the biomatrix is exposed to the incoming pollutant-laden air. Accordingly, it is desirable to maximize the ratio of the surface area of the filter bed to the volume of compost material. A possible disadvantage of the biological filter unit disclosed in U.S. Pat. No. 5,518,920 is that the surface area of the compost beds relative to the volume of the beds is rather small. Further possible disadvantages are that a thick bed of biofilter material may result in a rather large back pressure, requiring use of a large amount of energy to maintain the flow of air through the filter bed, channeling of the air flow through the filter bed, and compaction.

U.S. Pat. No. 4,203,935 discloses a filter media for scrubbers. The filter media is composed of structured packing balls, which are generally spherical bodies having a latticework mantle composed of an equatorial ring from which arcuate bars extend, each bar terminating in a polar region of the spherical body. The structured packing ball is designed to maximize the surface area of the latticework and to provide maximum capture of liquid droplets for effective scrubbing of air passing through the filter media against the liquid droplets.

SUMMARY OF THE INVENTION

In accordance with a first aspect of the invention there is provided an article of manufacture comprising a support element of generally ellipsoidal configuration, the support element having two opposite polar regions and including a medial ring intermediate the two opposite polar regions and a plurality of arcuate ribs extending from the medial ring to each polar region, adjacent arcuate ribs being angularly spaced to provide access to an interior space of the support element, and a cohesive body of biologically active material surrounding the support element and penetrating the interior space of the support element.

In accordance with a second aspect of the invention there is provided a method of manufacturing a biologically active filter matrix, comprising providing biologically active material in particulate form, providing a multiplicity of support elements of generally ellipsoidal configuration, each support element having two opposite polar regions and including a medial ring intermediate the two opposite polar regions and a plurality of arcuate ribs extending from the medial ring to each polar region, adjacent arcuate ribs being angularly spaced to provide access to an interior space of the support element, and intimately mixing the support elements with the biologically active material, whereby the biologically active material penetrates the interior spaces of the support elements and is divided into discrete bodies that surround the support elements respectively.

In accordance with a third aspect of the invention there is provided a biologically active filter, comprising a housing, a multiplicity of discrete biologically active filter elements in the housing, each biologically active filter element being substantially ellipsoidal in configuration, being dimensionally stable, having a maximum rectilinear dimension in a range from about 1 cm to about 3 cm, and being composed of a cohesive body of biologically active material.

BRIEF DESCRIPTION OF THE DRAWINGS

For a better understanding of the invention, and to show how the same may be carried into effect, reference will now be made, by way of example, to the accompanying drawings, in which FIGS. 1A–1D, collectively referred to herein as FIG. 1, show, respectively, a perspective view of a support element for holding compost material, a top plan view of the support element, a front elevation of the support element, and a side elevation of the support element, FIGS. 2A–2F, collectively referred to herein as FIG. 2, show, respectively, a perspective view of a biofilter element including a support element in accordance with FIG. 1, a top plan view of the biofilter element, a front elevation of the biofilter element, a side elevation of the biofilter element, a sectional view taken on the line 2E–2E of FIG. 2B, and a sectional view taken on the line 2F–2F of FIG. 2C.

DETAILED DESCRIPTION

Figure 1A:
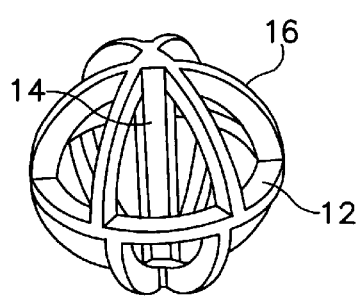
Figure 1B:
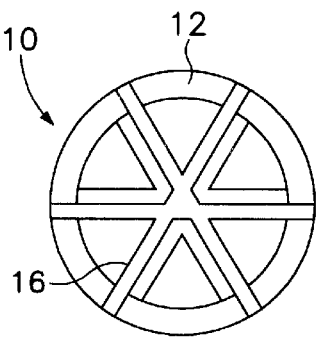
Figure 1C:
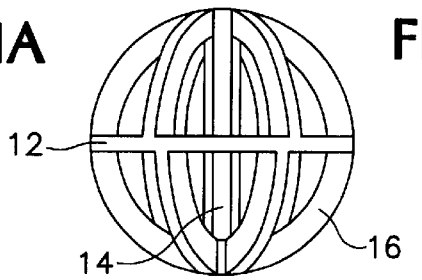
Figure 1D:
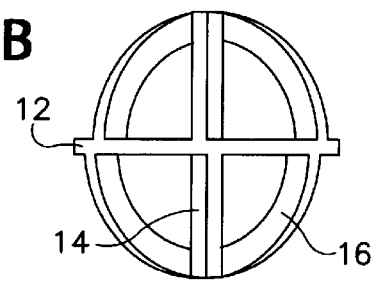
Figure 2A:
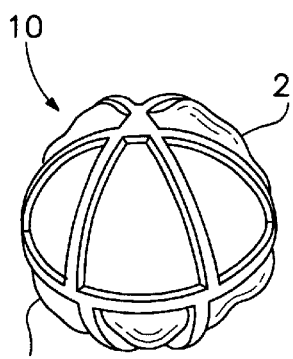
Figure 2B:
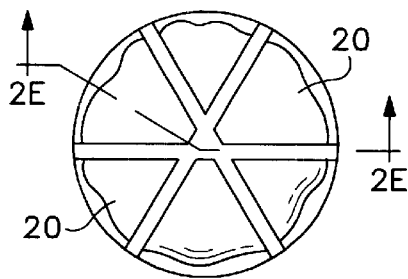
Figure 2C:
Figure 2D:
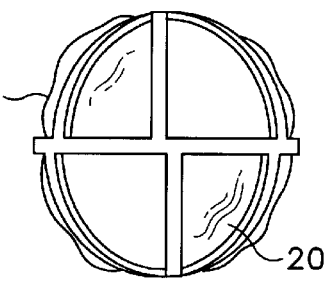
Figure 2E:
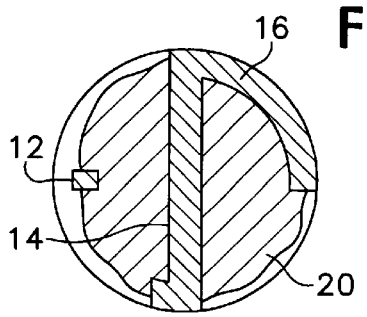
Figure 2F:
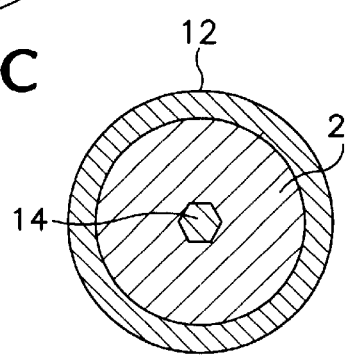

The support element 10 shown in FIG. 1 is sometimes referred to herein as a bioball. The bioball is generally spherical and includes an equatorial ring 12 and an axial post 14. Multiple arcuate meridian ribs 16 extend in each hemisphere of the generally spherical support element from the equatorial ring 12 to the polar region of the support element and are connected to the axial post 14. As shown in FIG. 1, there are six meridian ribs in each hemisphere and adjacent meridian ribs are angularly spaced at a nominal angle of about 60°. It can be seen in FIGS. 1 and 2 that each meridian rib is aligned with a corresponding rib in its own hemisphere, forming a half ring, and that for each half ring in one hemisphere, there is a corresponding half ring in the other hemisphere, the two corresponding half rings being disposed parallel to but slightly offset from each other. This offset, which is provided for ease of manufacture, results in the central plane of each half ring being spaced slightly from the central axis of the equatorial ring 11. Consequently, the nominal angular spacing between adjacent meridian ribs in a given hemisphere is not 60° but the nominal angle between a given meridian rib and one of two adjacent meridian ribs is slightly more than 60° and the nominal angle between the given meridian rib and the other adjacent meridian rib is slightly less than 60°.

The axial post 14 provides dimensional stability. If the bioball had more than six meridian ribs 16 in each hemisphere, or the ribs 16 were thicker, the axial post might not be required.

The bioball is used to provide a core for a discrete body of plant compost having a high microbial population. Prior to forming the discrete body, the compost is screened by passing through a ⅜ inch diamond mesh.

The support element 10 is approximately 2.5 cm in diameter. The equatorial ring 12 and the meridian ribs 16 form an open latticework. The thickness of the equatorial ring and the thickness and angular spacing of the meridian ribs are such that the openings of the latticework are about seven times the size of the largest compost particles.

A quantity of the screened compost and a large number (e.g. several thousand) of support elements as shown in FIG. 1 are placed in the mixing drum of a rotary mixer. The mixer is of the type that imparts a tumbling motion to the contents of the drum and the quantity of compost and support elements placed in the mixer are selected so that as the mixing drum rotates, the contents are vigorously blended.

The mechanical action of the mixer on the bioballs and compost forces the compost into the interior space of the bioball and coats the lattice work. Eventually, each bioball forms the core of a discrete spherical mass of compost. The composite structure comprising the bioball 10 and the compost 20 adhering thereto is referred to herein as a compost ball. The compost balls and any remaining compost are removed from the mixing drum. The compost balls are allowed to dry somewhat. On drying, the compost hardens and forms a cohesive, tough, dimensionally stable, generally spherical solid body having a diameter from about 3.2 cm to about 3.8 cm. FIG. 2 illustrates a compost ball 22 in which the diameter of the body of compost is slightly less than the diameter-of the bioball so that the equatorial ring 12 and the meridian ribs 16 are exposed at the surface of the compost ball.

Figure 3:
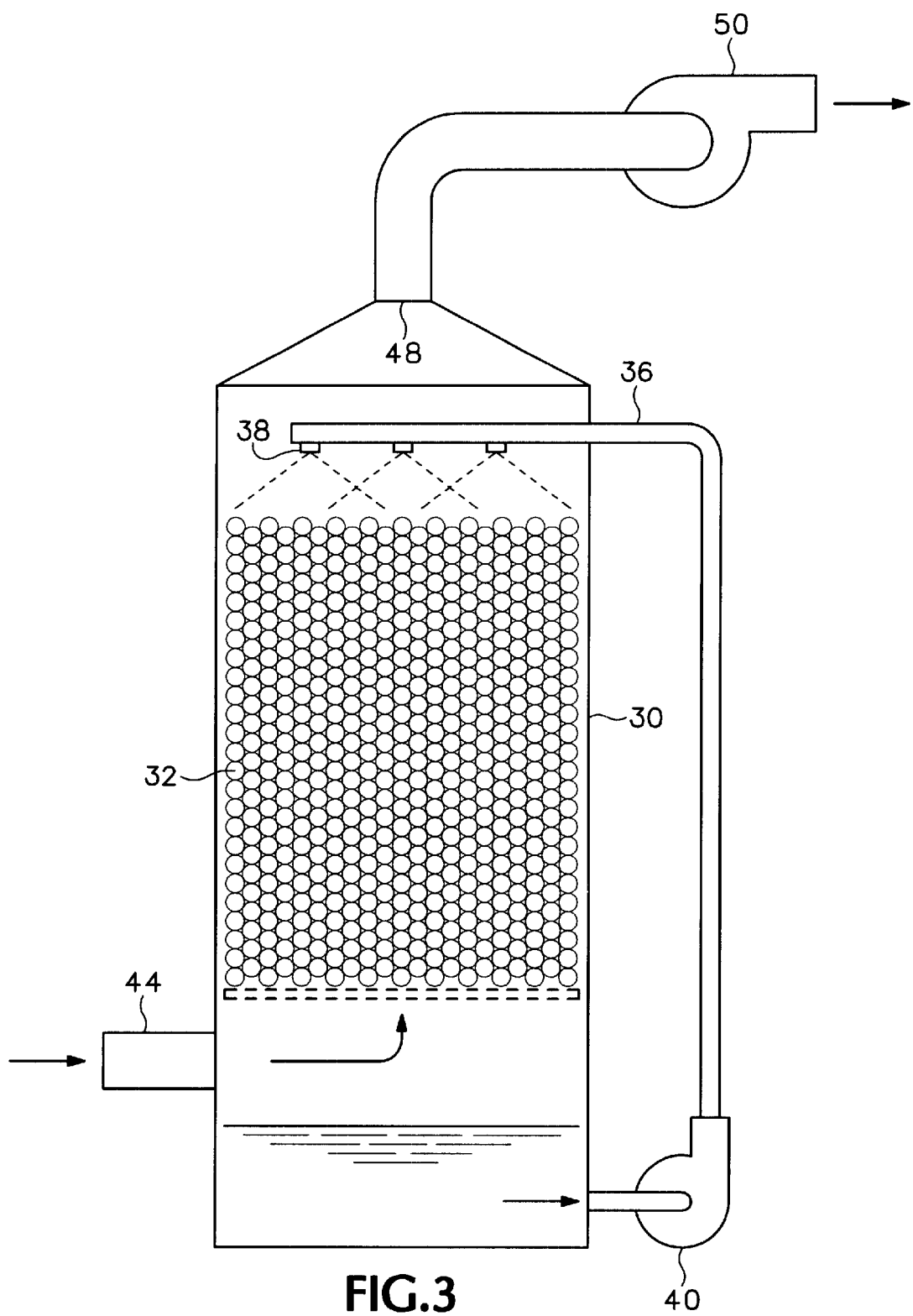
FIG. 3 is a sectional view of a biofilter unit including biofilter elements as shown in FIG. 2.

The biofilter unit shown in FIG. 3 includes a housing having side walls 30. Near the bottom of the housing is a support grid or grate. A bed 32 of discrete biologically active filter elements rests on the grid. The openings in the grid are small enough that the filter elements will not pass through the openings. Above the filter bed 32 is a spray tube 36 provided with spray nozzles 38 and connected to a pump 40 for spraying water onto the filter bed. Below the grid is an inlet opening 44 for supplying an upward flow of air containing VOCs. Above the spray tube is an outlet opening 48 which is connected to the suction side of a blower 50 for inducing a flow of air through the filter unit. Accordingly the VOC-laden air supplied through the inlet opening flows upward through the filter bed. The interstices between the filter elements provide a low impedance path for air to flow through the filter bed, but the size of the filter elements is selected so that the maximum distance between filter elements is small and therefore the VOC-laden air flows in intimate contact with the filter elements and the biological action of the filter elements converts the VOCs to non-toxic form.

Water drains from the filter bed 32 into a sump at the bottom of the housing and the pump 40 extracts water from the sump for spraying onto the filter bed.

The filter elements may be compost balls made in the manner described with reference to FIGS. 1 and 2. Inorganic materials, particularly materials that absorb VOCs, such as activated carbon and zeolite, may be included in the compost that is used to make the compost balls. Since biological degradation of VOCs results in release of carbon dioxide, the water in the filter bed may become acidic. In order to prevent the filter from becoming so acidic as to be hostile to the population of microorganisms, buffering compounds such as calcium carbonate may be included in the compost.

Even though the compost balls are wetted by water sprayed from the spray nozzles, the compost balls do not disintegrate but rather retain their spherical shape.

Although the support elements shown in FIGS. 1 and 2 are generally spherical, they may have another shape provided that the interstitial spaces between the filter elements allow ready air flow through the filter bed.

Although it is preferred that the support element should have a diameter of about 2.5 cm, the invention is not restricted to the support element having a diameter of 2.5 cm and compost balls could be made with support elements of diameter less than 2.5 cm or greater than 2.5 cm. Further, although the support element shown in FIG. 1 has six meridian ribs in each hemisphere, and this is preferred, the number of meridian ribs could be more than six or less than six. For example, with support elements that are larger than 2.5 cm diameter, it might be desirable to have more than six meridian ribs so that the maximum size of the opening in the lattice does not become too large.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. An article of manufacture comprising:
    a support element of generally ellipsoidal configuration, the support element having two opposite polar regions and including a medial ring intermediate the two opposite polar regions and a plurality of arcuate ribs extending from the medial ring to each polar region, adjacent arcuate ribs being angularly spaced to provide access to an interior empty space of the support element, and a cohesive body of biologically active material surrounding the support element and occupying the interior space of the support element.

2. An article according to claim 1, wherein the support element is of generally spherical configuration and each support element includes six to eight arcuate ribs extending from the medial ring to each polar region.

3. An article according to claim 2, wherein the support element has a diameter of about 2.5 cm, the medial ring and the arcuate ribs form a lattice having a maximum opening size of about 3.2 mm and the biologically active material is composed of particles that pass through a screen having openings no larger than about 9.5 mm.

4. An article according to claim 2, wherein the support element has six arcuate ribs extending from the medial ring to each polar region and also includes an axial post having two opposite ends at the two polar regions respectively and to which the ribs are secured.

5. An article according to claim 1, wherein the biologically active material includes a plant compost.

6. A method of manufacturing a biologically active filter matrix, comprising:

providing biologically active material in particulate form, providing a multiplicity of support elements of generally ellipsoidal configuration, each support element having two opposite polar regions and including a medial ring intermediate the two opposite polar regions and a plurality of arcuate ribs extending from the medial ring to each polar region, adjacent arcuate ribs being angularly spaced to provide access to an interior space of the support element, and intimately mixing the support elements with the biologically active material, whereby the biologically active material penetrates the interior spaces of the support elements and is divided into discrete bodies that surround the support elements respectively.

7. A method according to claim 6, comprising mixing the support elements with the biologically active material by tumbling.

8. A method according to claim 6, comprising passing the biologically active material through a screen having a maximum mesh size of approximately 9.5 mm.

9. A method according to claim 6, wherein the step of providing biologically active material in particulate form comprises providing plant compost in particulate form.

10. A biologically active filter, comprising:

a housing, a multiplicity of discrete biologically active filter elements in the housing, each biologically active filter element being substantially ellipsoidal in configuration, being dimensionally stable, and being composed of a support element and a cohesive body of biologically active material which surrounds the filter element and occupies an interior space of the support element.

11. A filter according to claim 10, wherein each biologically active filter element comprises a support element of biologically inert material forming a core surrounded by said cohesive body of biologically active material.

12. A filter according to claim 10, wherein the biologically active filter elements are substantially spherical in configuration and have a diameter from about 3.2 cm to about 3.8 cm.

13. A filter according to claim 12, wherein said support element is substantially spherical in configuration and has two opposite polar regions and includes an equatorial ring intermediate the two opposite polar regions and a plurality of arcuate meridian ribs extending from the equatorial ring to each polar region, adjacent meridian ribs being angularly spaced to provide access to an interior space of the support element, and wherein the cohesive body of each biologically active filter element surrounds the support element and occupies the interior space of the support element.

* * * * *